United States Patent
Suzuki et al.

(10) Patent No.: US 6,556,665 B1
(45) Date of Patent: Apr. 29, 2003

(54) PORTABLE TELEPHONE SET

(75) Inventors: Shinya Suzuki, Kanagawa (JP); Atsushi Ohkumo, Kanagawa (JP); Hirotsugu Matsuura, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/348,380

(22) Filed: Jul. 7, 1999

(30) Foreign Application Priority Data

Jul. 14, 1998 (JP) .......................................... 10-213431

(51) Int. Cl.⁷ .......................... H04M 1/64; H04M 11/00
(52) U.S. Cl. .................... 379/88.1; 379/67.1; 379/68; 379/88.07; 379/88.22; 379/93.05; 379/93.15
(58) Field of Search ........................ 379/67.1, 68, 71, 379/76, 85, 88.07, 88.1, 88.22, 93.05, 93.08, 93.15; 455/412, 413, 564, 567, 556

(56) References Cited

U.S. PATENT DOCUMENTS

| | | | |
|---|---|---|---|
| 4,481,382 A | * 11/1984 | Villa-Real | 455/556 |
| 5,390,236 A | * 2/1995 | Klausner et al. | 379/67.1 |
| 5,394,445 A | * 2/1995 | Ball et al. | 379/67.1 |
| 5,553,125 A | * 9/1996 | Martensson | 379/140 |
| 5,559,860 A | * 9/1996 | Mizikovsky | 455/513 |
| 5,632,001 A | * 5/1997 | Terauchi | 395/2.1 |
| 5,915,214 A | * 6/1999 | Reece et al. | 455/406 |
| 6,018,671 A | * 1/2000 | Bremer | 455/567 |
| 6,148,213 A | * 11/2000 | Bertocci et al. | 455/462 |
| 6,366,649 B1 | * 4/2002 | Chun et al. | 379/88.01 |

FOREIGN PATENT DOCUMENTS

| | | |
|---|---|---|
| DE | 195 26 220 | 7/1996 |
| DE | 298 10 497 | 11/1998 |
| GB | 2 301 261 | 11/1996 |

OTHER PUBLICATIONS

WO 96/02999.

* cited by examiner

Primary Examiner—Allan Hoosain
(74) Attorney, Agent, or Firm—Pearne & Gordon LLP

(57) ABSTRACT

In a portable telephone set, an input audio signal such as an audio signal is received through a microphone (111), and is then amplified by an amplifier (112). The output of the latter (112) is applied through an analog-to-digital converter (113) to a DSP (301), where it is compressed and stored in a memory (303) with the aid of a CPU (302), or it is stored therein as it is. Here, an audio signal from outside which is stored in the portable telephone set can be used as a calling sound or alarm sound. Therefore, selection of calling sounds or alarm sounds in the portable telephone set of the invention is wider than in the conventional one.

7 Claims, 1 Drawing Sheet

PORTABLE TELEPHONE SET

BACKGROUND OF THE INVENTION

This invention relates to a portable telephone set, particularly, to a technique of generating a calling sound or an alarm sound. More particularly, audio signal is input from a microphone so as to be used as the calling sound or the alarm sound of the portable telephone set.

As shown in FIG. 3, in a conventional portable telephone set, its calling sound or alarm sound is outputted as follows: That is, the calling sound or alarm sound is set up in a melody generating unit 103 in advance. In response to the arrival of a calling signal, a CPU 104 instructs the melody generating unit 103 to generate a particular sound, which is outputted through an amplifier 102 and a loud-speaker 101.

In the case where the CPU 104 forms the combination of particular sounds on the basis of data inputted through a key, a memory 105 transmits data on the combination of sounds to the CPU 104, and the latter 104 forms the combination of sounds and instructs the melody generating unit 103.

In the above-described calling sound or alarm sound generating method, sounds determined inside the portable telephone set or the combinations of sounds are used, or the combinations of calling sounds or alarm sounds inputted through the key are used. Therefore, only the particular calling sound or alarm sound is outputted; that is, selection of the calling sound or alarm sound is narrow.

SUMMARY OF THE INVENTION

Accordingly, an object of the invention is to eliminate the above-described difficulties accompanying a conventional portable telephone set. More specifically, an object of the invention to provide a portable telephone set which is so designed that, in the generation of the calling sound or alarm sound thereof, an audio signal is inputted through a microphone, and is used as a calling sound or alarm sound, so that selection of the calling sound or alarm sound is wide.

In order to solve the above-described problem, in the invention, for instance an audio signal is inputted through a microphone and stored in the portable telephone set, and the audio sound thus inputted is utilized as a calling sound or alarm sound.

Hence, in addition to a calling sound or alarm sound which has been fixed in a portable telephone set, many kinds of calling sounds or alarm sounds can be produced; that is, selection of a calling sound or alarm sound is widened as much.

Particularly, according to first aspect of the invention, a digital portable telephone set comprises: input means for amplifying an input audio signal which is inputted through a microphone; conversion means for subjecting the input audio signal amplified by the input means to analog-to-digital conversion; compressing means for compressing the input audio signal converted by the conversion means; and memory means for storing the input audio signal which has been compressed by the compressing means; control means for specifying the input audio signal stored, in the case where a input audio signal stored is used as a calling sound when the portable telephone set receives a calling signal; decompressing means for decompressing the input audio signal which is taken out by the control means; amplifier means for amplifying the input audio signal which has been decompressed by the decompressing means; and notifying means for notifying, as a calling sound, a called party of the input audio signal amplified by the amplifier means.

That is, sounds which can be utilized as calling sounds or alarm sounds are inputted through the microphone and stored to widen the selection of kinds of sound.

Preferably, in the portable telephone, in the case where, when the input audio signal is stored, a plurality of inputs are stored, the control means specifies storing locations.

In the invention, too, sounds which can be utilized as calling sounds or alarm sounds are inputted through the microphone and stored to widen the selection of kinds of sound.

More preferably, in the portable telephone set, the input audio signal thus stored is reproduced, and notifies a called party, as an alarm sound of the telephone set, of the input audio signal thus reproduced.

Similarly as in the case of the calling sound, the selection of kinds of alarm sound is widened.

More preferably, in the portable telephone, an audio signal inputted through the microphone which has been stored and reproduced is used as a calling sound of the telephone set, and the audio signal inputted through the microphone which has been stored and reproduced is also used as an alarm signal of the telephone set.

Accordingly, the selection of kinds of sound which can be utilized as calling sounds or alarm sounds is widened.

Further, according to the second aspect of the invention, a digital portable telephone set comprises: input means for amplifying an input audio signal which is inputted through a microphone; A/D (analog-to-digital) conversion means for subjecting the input audio signal amplified by the input means to analog-to-digital conversion; memory means for storing the input means converted by the conversion means; control means for specifying the input audio signal stored, in the case where a input audio signal stored is used as a calling sound when the portable telephone set receives a calling signal; D/A conversion means for subjecting to digital-to-analog conversion which is taken out by the control means; amplifier means for amplifying the input audio signal which has been converted by the D/A conversion means; and notifying means for notifying, as a calling sound, a called party of the input audio signal amplified by the amplifier means.

In this invention, too, the selection of kinds of sound which can be utilized as a calling sound or alarm sound is widened.

Preferably, in the case where, when the input audio signal is stored, a plurality of inputs are stored, the control means specifies storing locations.

In the portable telephone set, sounds which can be utilized as calling sound or alarm sounds are inputted through the microphone and stored, to widen the selection of kinds of sound.

More preferably, the input audio signal thus stored is reproduced, and notifies a called party, as an alarm sound of the telephone set, of the input audio signal thus reproduced.

With the portable telephone set, similarly as in the case of the calling sounds, the selection of kinds of alarm sound can be widened.

More preferably, an audio signal inputted through the microphone which has been stored and reproduced is used as a calling sound of the portable telephone set, and the audio signal inputted through the microphone which has been stored and reproduced is also used as an alarm signal of the telephone set.

With those means, selection of kinds of sound which can be utilized as calling sounds or alarm sounds can be widened.

Furthermore, according to third aspect of the invention, a digital portable telephone set comprises: memory means for storing a sound signal of a calling party which is received from the calling party; control means for specifying the audio signal of the calling party thus stored, in the case where the sound signal of the calling party thus stored is used as a calling sound when the portable telephone set receives a calling signal; D/A conversion means for subjecting to digital-to-analog conversion which is taken out by the control means; amplifier means for amplifying the audio signal of the calling party which has been converted by the D/A conversion means; and notifying means for notifying, as a calling sound, the called party of the audio signal of the calling party amplified by the amplifier means.

In the invention, too, selection of kinds of sound which can be utilized as calling sounds or alarm sounds can be widened.

Preferably, in the portable telephone set, the audio signal of the calling party thus stored is reproduced, and notifies a called party, as an alarm sound of the portable telephone set, of the audio signal thus reproduced.

With the portable telephone set, similarly as in the case of the calling sounds, selection of kinds of alarm sound is widened.

More preferably, the input audio signal thus stored is reproduced, and notifies a called party, as an alarm sound of the telephone set, of the input audio signal thus reproduced.

With the portable telephone set, similarly as in the case of the calling sounds, the selection of kinds of alarm sound can be widened.

DETAILED DESCRIPTION OF THE PRESENT INVENTION

Figure 1:
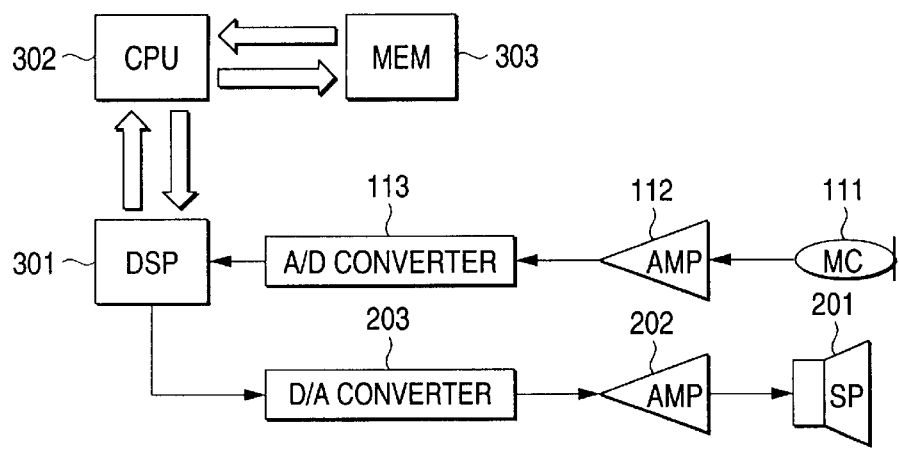
FIG. 1 is a block diagram for a description of the arrangement of an input/output system for generation of a calling sound and an alarm sound in an example of a portable telephone set, which constitutes a first embodiment of the invention.

Preferred embodiments of the invention will be described with reference to FIGS. 1 and 2.
First Embodiment An example of a portable telephone set, which constitutes a first embodiment of the invention, is as shown in FIG. 1. FIG. 1 shows the arrangement of an input/output system for generation of a calling sound and an alarm sound in the first embodiment.

In FIG. 1, an input signal such as an audio signal is received by a microphone 111, and is then amplified by an amplifier 112. The output of the latter 112 is subjected to A/D (analog-to-digital) conversion by an analog-to-digital converter 113, and the output of the latter 113 is applied to a DSP (digital signal processor) 301 where it is compressed or converted. The output signal of the DSP 301 is stored through a CPU 302 in a memory 303. Hence, the audio signal from outside which has been stored in the portable telephone set can be used as a calling sound or alarm sound. Thus, in the invention, selection of the calling sound or alarm sound is much wider than in the prior art.

That is, the audio signal stored in the memory 303 which is employed as the calling sound is determined in advance. In response to the calling, the CPU 302 provides an instruction so that the audio signal thus determined is read out of the memory 303. If the signal is compressed, then it is decompressed by the DSP 301. If the signal is not compressed, then it is converted, as it is, by a D/A (digital-to-analog) converter 203 into an analog signal. The analog signal thus obtained is amplified by an amplifier 202. The output of the latter 202 is outputted as a calling sound by a loud-speaker 201.

In the case where it is used as an alarm sound, a predetermined time is set as in the case of an alarm clock. When the predetermined time occurs, the CPU 302 reads the predetermined audio signal out of the memory 303. If the signal has been compressed, then it is decompressed (restored). If it has been not compressed, then it is converted into an analog signal by the digital-to-analog converter 203. The analog signal thus obtained is amplified by the amplifier 202, and the output of the latter 202 is outputted as an alarm sound through the loud-speaker.

In the embodiment, the audio signal is compressed or decompressed by the DSP (digital signal processor) 301; however, in place of the DSP 301, the A/D converter 113, the D/A converter 203, and the CPU 302 may be directly coupled to one another.
Second Embodiment FIG. 2 shows another example of the portable telephone set, which constitutes a second embodiment of the invention. More specifically, FIG. 2 shows the arrangement of an input/output system for generation of a calling signal and an alarm signal.

The second embodiment (FIG. 2) is obtained by adding an antenna 304, a receiving section 306, and a switch 305 to the first embodiment (FIG. 1).

Figure 2:
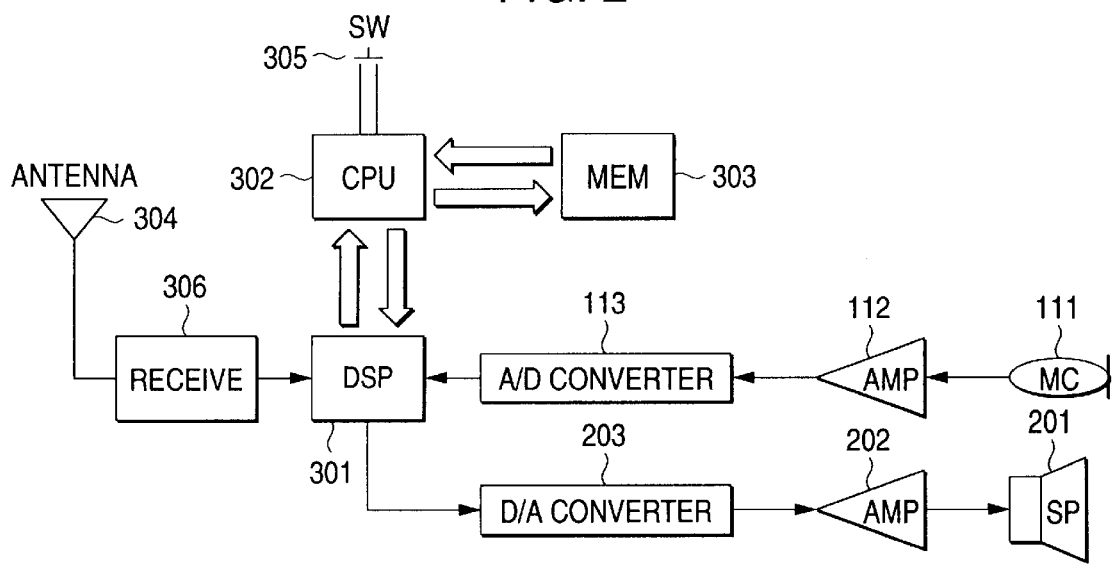
FIG. 2 is a block diagram for a description of the arrangement of an input/output system for generation of a calling sound and an alarm sound in another example of the portable telephone set, which constitutes a second embodiment of the invention.
Figure 3:
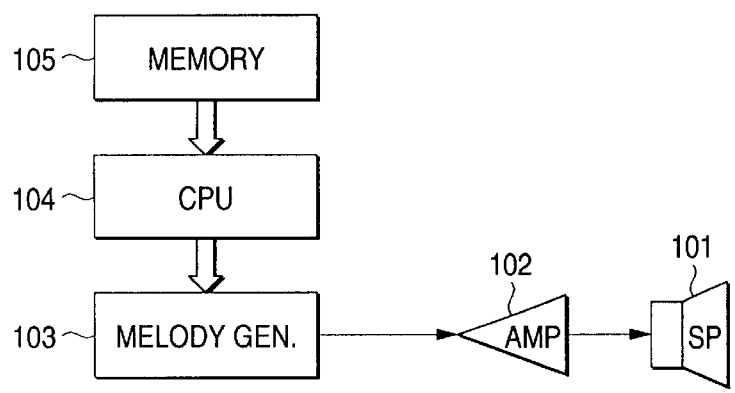
FIG. 3 is a block diagram for a description of the generation of a calling sound and an alarm sound in a conventional portable telephone set.

In FIG. 2, in order to store the audio signal in the memory 303 which is received from the calling party through the antenna 304, during the call the switch 305 is operated which functions to instruct the CPU to effect a memory mode to store an audio signal from the calling party.

The audio signal from the calling party is received through the antenna 304 by the receiving section 306, and the CPU 302 operates to store the audio signal thus received in the memory 303 through the DSP 301.

Thereafter, similarly as in the case where an audio signal received through the microphone is recorded, the audio signal, which is used as a calling sound and has been stored in the memory 303, is specified. Hence, upon arrival of a calling signal, it is converted into an analog signal by the D/A converter 203, and the analog signal is amplified by the amplifier 202 and outputted as a calling sound by means of the loud-speaker 201. A method of using it as an alarm sound, is equal to the method in the first embodiment.

As was described above, in the portable telephone set of the invention, an input audio signal which can be utilized as a calling sound or alarm sound is obtained through the microphone, and is used as a calling sound or alarm sound. While, in the conventional portable telephone set, only a particular calling sound or alarm sound, or a particular combination of sounds which are calling sounds or melody sounds are employed, in the portable telephone set of the invention all input signals such as audio signals inputted through the microphone can be used as calling sounds or alarm sounds; and therefore selection of calling sounds or alarm sounds is wide.

In the portable telephone set which is so designed that the audio signal of the calling party is stored, the audio signal of the calling party can be used as a calling sound or alarm sound of the telephone set.

What is claimed is:

1. A digital portable telephone comprising:

input means for inputting an analog audio signal;

amplifying means for amplifying said analog audio signal into an amplified audio signal;

A/D conversion means for converting said amplified audio signal into a digital audio signal;

compressing means for compressing said digital audio signal into a compressed audio signal;

memory means for storing said compressed audio signal as a stored audio signal, for storing an alarm sound, and for storing a melody;

control means for selecting an alarm signal for automatically notifying a user of an alarm condition, said alarm condition being different from the arrival of a call, wherein said alarm signal is one of said melody, said alarm sound and said stored audio signal;

decompressing means for decompressing said stored audio signal selected by said control means into a decompressed audio signal;

D/A conversion means for converting said decompressed audio signal, said alarm sound, or said melody into a notification signal;

amplifying means for amplifying said notification signal into an amplified notification signal; and notifying means for annunciating said amplified notification signal to the user to notify the user of the alarm condition, wherein, if said control means selected said stored audio signal as an alarm signal, said amplified notification signal resembles said analog audio signal.

2. A digital portable telephone comprising:

input means for inputting an analog audio signal;

amplifying means for amplifying said analog audio signal into an amplified audio signal;

A/D conversion means for converting said amplified audio signal into a digital audio signal;

compressing means for compressing said digital audio signal into a compressed audio signal;

memory means for storing said compressed audio signal as a stored audio signal, wherein said memory means stores a plurality of stored audio signals, said memory means also for storing an alarm sound, a calling sound, and a melody;

control means for selecting one of said stored audio signals, said melody, and said calling sound for notifying a user of the arrival of a call, and further for selecting another one of said stored signals, said melody, and said alarm sound for automatically notifying the user of an alarm condition different from the arrival of a call;

decompressing means for decompressing said stored audio signal selected by said control means into a decompressed audio signal;

D/A conversion means for converting said decompressed audio signal, said alarm sound, said calling sound, or said melody into an analog notification signal;

amplifying means for amplifying said analog notification signal into an amplified notification signal; and notifying means for annunciating said amplified notification signal to the user, wherein, if said control means selected said stored audio signal as a notification signal, said notification signal resembles said analog audio signal.

3. A digital portable telephone comprising:

receiving means for receiving a notification sound signal from a calling party other than a user of the digital portable telephone;

memory means for storing said notification sound signal as a stored notification sound signal, for storing a calling sound, and for storing a melody;

control means for selecting one of said stored notification sound signal, said calling sound, and said melody for notifying a user of the arrival of a call;

D/A conversion means for converting said stored notification sound signal, said calling sound, or said melody into an analog notification signal;

amplifying means for amplifying said analog notification signal into an amplified notification signal; and notifying means for annunciating said amplified notification signal to the user for notifying the user of the arrival of a call.

4. The digital portable telephone of claim 3 wherein said memory means stores a plurality of stored sound signals, and further wherein said control means is for selecting one of said stored sound signals for notifying a user of the arrival of a call, and further for selecting another one of said stored sound signals for notifying a user of an alarm condition different from the arrival of a call; and still further wherein said notifying means is for notifying the user of said alarm condition or of the arrival of a call.

5. The digital portable telephone of claim 3 wherein the step of notifying a user of the arrival of a call is for a call initiated by the calling party.

6. A digital portable telephone comprising:

receiving means for receiving a notification sound signal from a calling party other than a user of the digital portable telephone;

memory means for storing said notification sound signal as a stored notification sound signal, for storing an alarm sound, and for storing a melody;

control means for selecting one of said stored notification sound signal, said alarm sound, and said melody for notifying a user of an alarm condition, said alarm condition different than the arrival of a call;

D/A conversion means for converting said stored notification sound signal, said alarm sound, or said melody into an analog notification signal;

amplifying means for amplifying said analog notification signal into an amplified notification signal; and notifying means for annunciating said amplified notification signal to the user for notifying the user of the alarm condition.

7. A digital portable telephone comprising:

input means for inputting an analog audio signal;

amplifying means for amplifying said analog audio signal into an amplified audio signal;

A/D conversion means for converting said amplified audio signal into a digital audio signal;

compressing means for compressing said digital audio signal into a compressed audio signal;

memory means for storing said compressed audio signal as a stored audio signal, for storing a calling sound, and for storing a melody;

control means for selecting said stored audio signal a call arrival signal for notifying a user of the arrival of a call wherein said call arrival signal is one of said melody, said calling sound and said stored audio signal;

decompressing means for decompressing said stored audio signal selected by said control means into a decompressed audio signal;

D/A conversion means for converting said decompressed audio signal, said calling sound, or said melody into a notification signal;

amplifying means for amplifying said notification signal into an amplified notification signal; and notifying means for annunciating said amplified notification signal to the user to notify the user of the arrival of a call, wherein, if said control means selected said stored audio signal as a call arrival signal, said amplified notification signal resembles said analog audio signal.

* * * * *

UNITED STATES PATENT AND TRADEMARK OFFICE
CERTIFICATE OF CORRECTION

PATENT NO.    : 6,556,665 B1
DATED         : April 29, 2003
INVENTOR(S)   : Suzuki et al.

It is certified that error appears in the above-identified patent and that said Letters Patent is hereby corrected as shown below:

<u>Title page,</u>
Item [57], ABSTRACT,
Line 7, please delete "Here,", and insert therefor -- Hence, --.

Signed and Sealed this

Ninth Day of September, 2003

JAMES E. ROGAN
*Director of the United States Patent and Trademark Office*